UNITED STATES PATENT OFFICE.

JOHN M. WILSON, OF MONTCLAIR, NEW JERSEY, ASSIGNOR TO WILSON REMOVER COMPANY, OF NEWARK, NEW JERSEY, A CORPORATION OF NEW JERSEY.

PROCESS OF MAKING FINISH-REMOVERS.

1,074,305. Specification of Letters Patent. Patented Sept. 30, 1913.

No Drawing. Application filed July 17, 1908. Serial No. 443,982.

*To all whom it may concern:*

Be it known that I, JOHN M. WILSON, a citizen of the United States, and resident of Montclair, in the county of Essex and State of New Jersey, have invented certain new and useful Improvements in Processes of Making Finish-Removers, of which the following is a specification.

This invention relates to improvements in the manufacture of finish removers adapted to remove thin films of paint, varnish or wax, which removers contain dissolved thickening agents in solution therein, and has for its objects the production of a mixture which, while substantially free from benzole, contains wax in complete solution therein, in addition to dissolved oxy-derivatives of cellulose, such as acetyl-cellulose, and particularly pyroxylin.

Heretofore in the production of benzole-free, alcoholic wax-containing removers, it has been customary to add a considerable quantity of phenol to the wax or other analogous substance, and to subsequently precipitate the said wax by means of a wax-precipitant, such as alcohol, and at the same time preventing the deposition of the wax by the addition of a suitable quantity of a dissolved thickening agent, other than wax, such as pyroxylin, cellulose-acetate and lower nitrates of cellulose. These mixtures, however, were usually exceedingly viscous, due to the amount of dissolved thickening agent employed to maintain the wax in homogeneous and permanent suspension in the said mixture, and it has been difficult on this account to utilize such removers in many cases where a thin remover is preferable, if not essential. When it has been attempted to dilute these mixtures the precipitation of the wax has resulted, and one of the principal properties of the remover, to wit, that of forming a soft yet tenacious film, upon the superficial evaporation of the volatile ingredients, has been destroyed.

I have discovered that it is possible to produce a so-called thin remover directly from these viscous removers containing wax in homogeneous and permanent suspension therein, such removers being herein termed "emulsion removers," while at the same time preserving the many valuable properties of the thick or emulsion remover, and thereby am enabled to evolve a remover which can be conveniently applied to a surface as a fine stream or jet, by means of pneumatic pressure.

In carrying out my invention I prefer to proceed as follows: Six ounces of paraffin wax, six ounces of beeswax and 4 ounces of cerasin wax are heated together until melted, with 32 ounces of phenol crystals, preferably the commercial crystals. Into this mixture, preferably at a temperature approximating 70° C. is introduced a collodion solution, preferably 16 ounces, said solution containing aprpoximately 7 and ½ per cent. of solids (pyroxylin) and 92 and ½ per cent. of solvent, preferably alcohol containing 5 per cent. of ethyl-acetate. Sufficient alcohol is then added to this mixture to produce eight pounds of a wax-containing finish remover therefrom, it being evident that the alcohol can be added prior to the addition of the collodion solution and the collodion solution may be subsequently introduced, or the amount of alcohol required to produce a gallon may be added subsequent to the mixing of the collodion, waxes and phenol.

In order to produce a thin remover from the aforesaid mixture, which consists essentially of alcohol and contains approximately 25 per cent. of phenol, I then add three parts of acetone and alcohol respectively to one part of said emulsion remover whereby the resulting mixture contains approximately three-sevenths acetone, three-sevenths alcohol, preferably wood alcohol, although denatured alcohol can likewise be employed, if desired, and one-seventh of the aforesaid mixture consisting of viscous finish remover.

The addition of acetone-alcohol mixture as aforesaid destroys the equilibrium of the original mixture and effects the deposition of the wax previously held in homogeneous and permanent suspension therein and thereby I am enabled to produce a thin remover by merely decanting the supernatant liquid from the segregated deposit of wax which collects at the bottom of the solution.

This mixture, as previously stated, possesses the valuable film-forming property of the original emulsion remover, from which it is obtained in the manner described, and upon exposure of the mixture to the atmosphere a soft, substantially impervious non-adhesive film is formed which prevents the immediate evaporation of the volatile liquids occluded beneath the said film for periods extending over several hours and thereby permits of the continued action of volatile solvents such as methyl or wood alcohol and acetone upon dried or weathered films of paint, varnish or wax to which they are applied, for sufficiently long periods of time to permit of the complete destruction of the same in the manner well known. The destroyed films of paint, varnish or wax consist of viscous magmas containing dissolved oils, waxes and shellac, together with insoluble pigments, which possess little affinity for the underlying surfaces when removed within reasonable periods of time after the first application of the finish remover thereto, and accordingly may be readily removed from the surfaces underlying the same with a knife or other suitable device, in the manner well known.

It is evident that, if desired, alcohol alone may be added in lieu of any acetone, in which case two parts of alcohol are preferably added to one part of emulsion finish remover, but preferably a limited amount of acetone is added because of the effective solvent properties possessed by said acetone.

The division of the process of manufacture into two operations as herein described is for the purpose of securing the maximum amount of wax in complete solution, while employing a minimum amount of phenol, and the addition of the entire amount of alcohol directly to the mass of wax, phenol and collodion tends to prevent the maximum solution of wax as when the alcohol is subsequently added to a finish remover containing alcohol and an excess of wax in suspension therein as previously described herein. In fact, owing to the complete absence of wax-solvents, such as benzole and the like, which are capable of readily dissolving wax, it is necessary to employ even greater care to prevent the complete precipitation of the wax when the alcohol is added, and this is accomplished, as herein described, by the prior addition of the collodion or thickening agent in order to counterbalance the tendency of the wax to precipitate upon the addition of alcohol.

It is well known that ethyl acetate is an excellent solvent for oils and the like, whereas alcohol is miscible with but few oils, and accordingly in the claims I do not include under the classification of an oil-solvent alcoholic compounds, such as alcohol, whether ethyl alcohol, methyl or other alcohols.

Having thus described my invention what I claim is:

1. The process which consists in causing a wax-precipitant to react upon an "emulsion" finish remover containing wax in homogeneous and permanent suspension therein, thereby destroying the equilibrium of said emulsion and effecting the deposition of said wax, and then separating the substantially clear, supernatant, solution from said deposited wax.

2. The process which consists in causing a wax-precipitant to react upon an "emulsion" finish remover containing wax in substantially permanent suspension therein, thereby destroying the equilibrium of said emulsion and effecting the deposition of said wax, the amount of wax-precipitant being in excess of the amount of emulsion remover treated, and then separating the substantially clear, supernatant solution from the said deposited wax.

3. The process which consists in causing a wax-precipitant to react upon a finish remover containing a wax-solvent, a wax-precipitant, a dissolved thickening agent and wax, said wax being in homogeneous and substantially permanent suspension in said finish remover, thereby destroying the equilibrium of said finish remover and effecting the segregation of the wax suspended therein, and then separating the substantially clear supernatant solution from the said deposited wax.

4. The process which consists in causing an alcoholic wax-precipitant to react upon phenol, wax and a dissolved thickening agent, the amount of said wax-precipitant being sufficient to reduce the viscosity of the resultant mixture sufficiently to prevent the permanent suspension of any precipitated wax therein, whereby a thin remover, substantially free from particles of wax, may be obtained.

5. The process which consists in causing a mixture containing alcohol and acetone to react upon phenol, wax and an oxy-compound of cellulose in solution, the amount of said mixture of alcohol and acetone being sufficient to reduce the viscosity of the resultant mixture sufficiently to prevent the permanent suspension of any precipitated wax therein, whereby a thin remover substantially free from particles of wax may be obtained.

6. The process which consists in causing an alcoholic wax-precipitant to react upon a finish remover containing wax in substantially permanent suspension therein, said finish remover containing in excess of twenty per cent. of phenol, the amount of wax-precipitant added thereto being more than double the amount of finish remover treated, and then separating the substantially clear supernatant solution from the said deposited wax whereby a thin remover, containing less than ten per cent. of phenol and substantially free from precipitated wax in permanent suspension, may be obtained.

7. The process which consists in causing an alcoholic wax-precipitant to react upon a finish remover containing wax in substantially permanent suspension therein, said finish remover containing in excess of twenty per cent. of phenol, the amount of wax-precipitant added thereto being more than double the amount of finish remover treated, and then separating the substantially clear supernatant solution from the said deposited wax, whereby a thin remover, containing less than ten per cent. of phenol, and substantially free from precipitated wax in permanent suspension, may be obtained.

Signed at New York, in the county of New York and State of New York, this 3d day of July, A. D. 1908.

JOHN M. WILSON.

Witnesses:
W. H. SWENARTON,
P. COMPTON MILLER.